(12) United States Patent
Youn et al.

(10) Patent No.: US 12,742,946 B2
(45) Date of Patent: Sep. 22, 2026

(54) OPTICAL IMAGING SYSTEM

(71) Applicant: SAMSUNG ELECTRO-MECHANICS CO., LTD., Suwon-si (KR)

(72) Inventors: Han Ul Youn, Suwon-si (KR); Ji Su Lee, Suwon-si (KR); Dong Hyuk Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 278 days.

(21) Appl. No.: 18/489,427

(22) Filed: Oct. 18, 2023

(65) Prior Publication Data

US 2024/0201472 A1 Jun. 20, 2024

(30) Foreign Application Priority Data

Dec. 14, 2022 (KR) ........................ 10-2022-0174763

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

2020/0209593 A1 7/2020 Hirano
2020/0393652 A1 12/2020 Kuo
2021/0278636 A1 9/2021 Lin et al.
2021/0341712 A1 11/2021 Kuo
2022/0075144 A1 3/2022 Shang
2022/0075146 A1 3/2022 Hu
2022/0146793 A1* 5/2022 Zhou .................. G02B 13/0045
2022/0171162 A1 6/2022 Jang et al.
2022/0196977 A1* 6/2022 Lai ........................... G02B 3/04
2022/0196980 A1* 6/2022 Lai ........................... G02B 9/64
(Continued)

FOREIGN PATENT DOCUMENTS

CN 212515176 U 2/2021
CN 213338178 U 6/2021
(Continued)

OTHER PUBLICATIONS

Taiwanese Office Action issued on Aug. 28, 2024, in counterpart Taiwanese Patent Application No. 113128775 (8 pages in English, 7 pages in Chinese).

(Continued)

*Primary Examiner* — Darryl J Collins
(74) *Attorney, Agent, or Firm* — NSIP Law

(57) ABSTRACT

An optical imaging system is provided. The optical imaging system includes a first lens, a second lens, a third lens, a fourth lens, a fifth lens, a sixth lens, a seventh lens, an eighth lens, and a ninth lens, sequentially arranged from an object side toward an image plane, wherein the optical imaging system satisfies the following conditional expressions [(1) TTL/2IMH<0.6, and (1) Fno<1.72, where TTL is a distance from an object side surface of the first lens to the image plane, 2IMH is a diagonal length of the image plane, and Fno is an F number of the optical imaging system.

16 Claims, 12 Drawing Sheets

(56) References Cited

U.S. PATENT DOCUMENTS

| | | | | |
|---|---|---|---|---|
| 2022/0283408 | A1* | 9/2022 | Tseng | G02B 13/0045 |
| 2023/0221525 | A1* | 7/2023 | Jhang | G02B 9/64<br>359/692 |
| 2023/0221526 | A1* | 7/2023 | Dong | G02B 9/64<br>359/692 |
| 2023/0221528 | A1* | 7/2023 | Jhang | G02B 13/0045<br>359/692 |
| 2023/0221529 | A1 | 7/2023 | Zhu et al. | |
| 2023/0221533 | A1* | 7/2023 | Dong | G02B 9/64<br>359/754 |
| 2024/0103253 | A1* | 3/2024 | Kuo | G02B 9/64 |

FOREIGN PATENT DOCUMENTS

| | | | |
|---|---|---|---|
| CN | 113759524 | A | 12/2021 |
| CN | 113885168 | A | 1/2022 |
| CN | 114114617 | A | 3/2022 |
| CN | 114355567 | A | 4/2022 |
| CN | 217521428 | U | 9/2022 |
| JP | 7080962 | B2 | 6/2022 |
| KR | 10-2022-0075942 | A | 6/2022 |
| TW | 202045974 | A | 12/2020 |
| TW | I743721 | B | 10/2021 |
| TW | 202328729 | A | 7/2023 |
| TW | 202344885 | A | 11/2023 |

OTHER PUBLICATIONS

Korean Office Action issued on Dec. 3, 2024, in counterpart Korean Patent Application No. 10-2022-0174763 (9 pages in English, 7 pages in Korean).

Taiwanese Office Action issued on Feb. 6, 2024, in counterpart Taiwanese Patent Application No. 112141407 (13 pages in English, 12 pages in Chinese).

* cited by examiner

OPTICAL IMAGING SYSTEM

CROSS-REFERENCE TO RELATED APPLICATIONS

This application claims the benefit under 35 USC § 119(a) of Korean Patent Application No. 10-2022-0174763 filed on Dec. 14, 2022, in the Korean Intellectual Property Office, the entire disclosure of which is incorporated herein by reference for all purposes.

BACKGROUND

1. Field

The following description relates to an optical imaging system.

2. Description of Related Art

As the operations of cameras in portable terminals has become increasingly important, various types of cameras (or modules) are being mounted in portable terminals.

As the demand for high resolution images gradually increases, the number of lenses constituting the camera also increases, and the form factor of portable terminals is miniaturized. Therefore, it may be desirable to develop a slim, high-resolution optical imaging system.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, a sixth lens, a seventh lens, an eighth lens, and a ninth lens, sequentially arranged from an object side toward an image plane, wherein the optical imaging system satisfies the following conditional expressions: (1) $TTL/2IMH<0.6$, and (2) $Fno<1.72$, where TTL is a distance from an object side surface of the first lens to the image plane, 2IMH is a maximum effective image height of the image plane, and Fno is an F number of the optical imaging system.

The first lens may have positive refractive power, the second lens may have negative refractive power, and the sixth lens may have negative refractive power.

An object side surface of any one of the fourth lens or the fifth lens may have a concave shape in a paraxial region.

The following conditional expression may be satisfied: $2.3<T1/T9<3.8$, where T1 is an optical axis thickness of the first lens, and T9 is an optical axis thickness of the ninth lens.

The following conditional expression may be satisfied: $1.7<TTL/\Sigma CT<1.9$, where TTL is a distance from an object side surface of the first lens to the image plane, and ΣCT is a sum of optical axis thicknesses of the first lens to the ninth lens.

The following conditional expression may be satisfied: $2.5<TTL/\Sigma AT<2.8$, where TTL is a distance from an object side surface of the first lens to the image plane, and ΣAT is a sum of optical axis intervals of the first lens to the ninth lens.

The following conditional expression may be satisfied: $-6<f2/f<-2$, where f2 is a focal length of the second lens, and f is a focal length of the optical imaging system.

The seventh lens and the eighth lens may have a convex object side surface and a concave image side surface.

The following conditional expression may be satisfied: $9<v1/f1<11$, where v1 is Abbe number of the first lens, and f1 is a focal length of the first lens.

The following conditional expression may be satisfied: $11<Fno*TTL<12$, where Fno is an F number of the optical imaging system, and TTL is a distance from an object side surface of the first lens to the image plane.

In a general aspect, an optical imaging system includes a first lens having positive refractive power; a second lens having negative refractive power; a third lens having refractive power; a fourth lens having a concave object side surface; a fifth lens having refractive power; a sixth lens having negative refractive power; a seventh lens having refractive power, and having a convex object side surface and a concave image side surface; an eighth lens having positive refractive power; and a ninth lens having negative refractive power, wherein the first lens to the ninth lens are sequentially arranged from an object side toward an image plane, and wherein the optical imaging system satisfies the following conditional expression: $Fno<1.72$, where Fno is an F number of the optical imaging system.

The following conditional expression may be satisfied: $1.4<\Sigma CT/\Sigma AT<1.6$, where ΣCT is a sum of optical axis thicknesses of the first lens to the ninth lens, and ΣAT is a sum of optical axis intervals of the first lens to the ninth lens.

The following conditional expression may be satisfied: $FOV*IMH/f<97$, where FOV is an angle of view of the optical imaging system, IMH is ½ of a diagonal length of the image plane, and f is a focal length of the optical imaging system.

The following conditional expression may be satisfied: $18<v1-v5<31$, where v1 is Abbe number of the first lens, and v5 is Abbe number of the fifth lens.

The following conditional expression may be satisfied: $TTL/2IMH<0.6$, where TTL is a distance from an object side surface of the first lens to the image plane, and 2IMH is a diagonal length of the image plane.

The following conditional expression may be satisfied: $2.3<T1/T9<3.8$, where T1 is an optical axis thickness of the first lens, and T9 is an optical axis thickness of the ninth lens.

In a general aspect, an optical imaging system includes a first lens, a second lens, a third lens, a fourth lens, a fifth lens, a sixth lens, a seventh lens, an eighth lens, and a ninth lens, sequentially arranged from an object side to an image plane, wherein the optical imaging system satisfies the following conditional expressions: (1) $TTL/2IMH<0.6$, and (2) $2.5<TTL/\Sigma AT<2.8$, where TTL is a distance from an object side surface of the first lens to the image plane, 2IMH is a diagonal length of the image plane, and ΣAT is a sum of optical axis intervals of the first lens to the ninth lens.

Other features and aspects will be apparent from the following detailed description, the drawings, and the claims.

Figure 1:
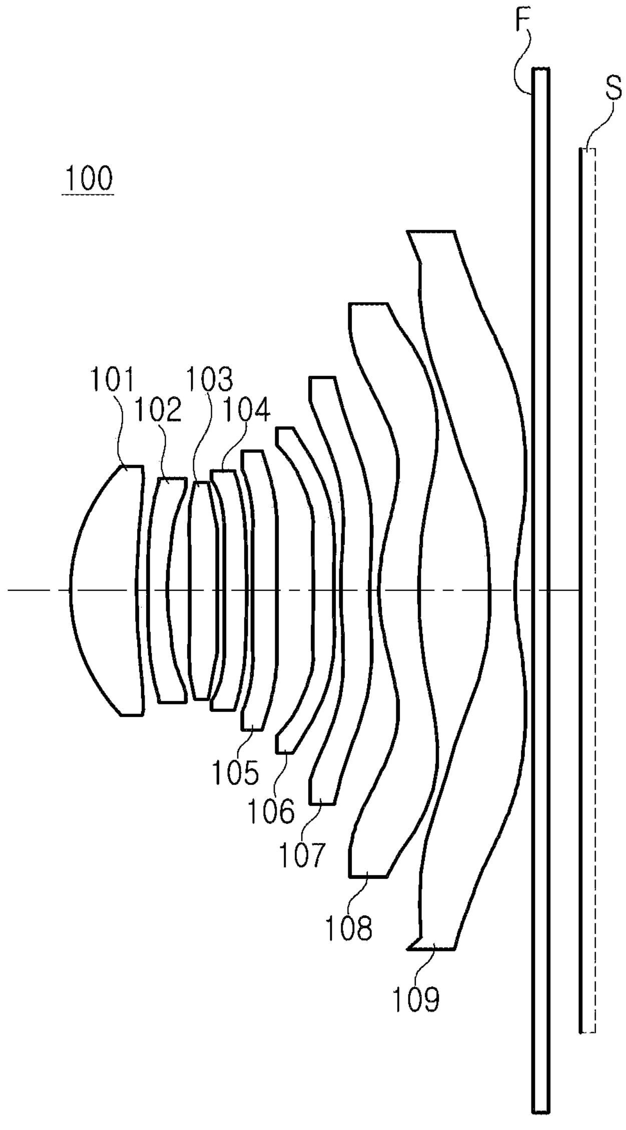
FIG. 1 illustrates a configuration diagram of an example optical imaging system, in accordance with a first embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In the drawings accompanying this specification, a thickness, a size, and a shape of a lens may be somewhat exaggerated for description, and in particular, a spherical shape or an aspherical shape illustrated in the drawings may be only illustrative, but are not limited thereto.

One or more examples may provide a slim optical imaging system to obtain high resolution images.

One or more examples may also provide an optical imaging system having a low F-number value, to acquire bright, or high resolution, images and videos.

An optical imaging system in accordance with one or more embodiments may include nine (9) lenses disposed along an optical axis. In an example, the optical imaging system may include a first lens, a second lens, a third lens, a fourth lens, a fifth lens, a sixth lens, a seventh lens, an eighth lens, and a ninth lens, sequentially arranged from an object side to an imaging side.

In the one or more examples, the first lens refers to a lens most adjacent to an object (or a subject), and the ninth lens refers to a lens most adjacent to an image plane (or an image sensor).

Additionally, in the one or more examples, a first surface of each of the lenses means a surface close to an object side (or an object side surface), and a second surface means a surface close to an image side (or an image side surface).

In the one or more examples, units of a radius of curvature, a thickness, a distance, a Total Track Length (TTL) (a distance from an object side surface of the first lens to an image plane), f (a focal length), an image height (IMH) (½ of a diagonal length of the image plane), and the like are indicated in millimeters (mm), and a unit of an angle of view (or field of view) (FOV) is indicated in degrees (°).

Additionally, in the descriptions of a shape of a lens, a configuration in which one surface of the lens is convex indicates that a paraxial region (a very narrow region near the optical axis) of the one surface is convex, and a configuration in which one surface of the lens is concave indicates that a paraxial region of the one surface is concave. Thus, even when it is described that one surface of a lens is convex, an edge of the lens may be concave. Similarly, even when it is described that one surface of a lens is concave, an edge of the lens may be convex.

An optical imaging system, in accordance with one or more embodiments, may include an image sensor (or an imaging device) having an imaging surface disposed at the image plane of an optical imaging system that converts an image of a subject incident through an optical imaging system into an electrical signal, and an infrared cut-off filter that blocks infrared rays. In an example, the infrared cut-off filter may be disposed between a prism and the image sensor.

Additionally, an optical imaging system, in accordance with one or more embodiments, may include a stop that adjusts an amount of light. In a non-limited example, the stop may be disposed between a second lens and a third lens.

In accordance with one or more embodiments, a plurality of lenses may be formed of a material having a refractive index, different from a refractive index of air. In example, first to ninth lenses may be formed of a plastic material.

Additionally, in accordance with one or more embodiments, at least one of a plurality of lenses may have an aspherical surface. For example, at least one of first to ninth lenses may have an aspherical surface. Alternatively, at least one of first and second surfaces of the first to ninth lenses may have an aspherical surface. The aspherical surfaces of the first to ninth lenses may be expressed by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad \text{Equation 1}$$

In Equation 1, c is the reciprocal of a radius of curvature of a corresponding lens, K is a conic constant, Y is a distance from any point on the aspherical surface to an optical axis, A to P are aspherical surface constants from the $4^{th}$ to the $30^{th}$ order in order, and Z (or SAG) is a distance in an optical axis direction from a certain point on the aspherical surface to a vertex of the corresponding aspherical surface.

First to ninth lenses constituting an optical imaging system according to an embodiment of the present disclosure may be positive refractive power, negative refractive power, positive/negative refractive power, positive/negative refractive power, positive/negative refractive power, negative refractive power, positive/negative refractive power, positive refractive power, and negative refractive power, sequentially from an object side. Additionally, in an example, the first to ninth lenses may be plastic lenses.

Additionally, an optical imaging system, in accordance with one or more embodiments, may satisfy at least one of the following conditional expressions:

$$0 < f1/f < 1.5 \quad \text{[Conditional Expression 1]}$$

$$-6 < f2/f < -2 \quad \text{[Conditional Expression 2]}$$

$$f3/f < 10 \quad \text{[Conditional Expression 3]}$$

$$f4/f > -9 \quad \text{[Conditional Expression 4]}$$

$$f5/f < 11 \quad \text{[Conditional Expression 5]}$$

$$f6/f < -1 \quad \text{[Conditional Expression 6]}$$

$$-4 < f7/f < 8 \quad \text{[Conditional Expression 7]}$$

$$0 < f8/f < 1.5 \quad \text{[Conditional Expression 8]}$$

$$-2 < f9/f < 0 \quad \text{[Conditional Expression 9]}$$

$$v1 - v3 < 40 \quad \text{[Conditional Expression 10]}$$

$$18 < v1 - v5 < 31 \quad \text{[Conditional Expression 11]}$$

$$TTL/f < 1.25 \quad \text{[Conditional Expression 12]}$$

-continued

| | |
|---|---|
| $BFL/f < 0.16$ | [Conditional Expression 13] |
| $TTL/2IMH < 0.6$ | [Conditional Expression 14] |
| $FOV^{*}IMH/f < 97$ | [Conditional Expression 15] |
| $Fno < 1.72$ | [Conditional Expression 16] |
| $1.7 < TTL/\Sigma CT < 1.9$ | [Conditional Expression 17] |
| $2.5 < TTL/\Sigma AT < 2.8$ | [Conditional Expression 18] |
| $1.52 < IMH/\Sigma CT$ | [Conditional Expression 19] |
| $2.1 < IMH/\Sigma AT$ | [Conditional Expression 20] |
| $1.3 < f1/\Sigma CT < 1.6$ | [Conditional Expression 21] |
| $1.8 < f1/\Sigma AT < 2.3$ | [Conditional Expression 22] |
| $11 < Fno^{*}TTL < 12$ | [Conditional Expression 23] |
| $1.4 < \Sigma CT/\Sigma AT < 1.6$ | [Conditional Expression 24] |
| $Fno/IMH < 3$ | [Conditional Expression 25] |
| $9 < v1/f1 < 11$ | [Conditional Expression 26] |
| $2.3 < T1/T9 < 3.8$ | [Conditional Expression 27] |

In the above conditional expressions, f is a focal length of the optical imaging system, f1 is a focal length of the first lens, f2 is a focal length of the second lens, f3 is a focal length of the third lens, f4 is a focal length of the fourth lens distance, f5 is a focal length of the fifth lens, f6 is a focal length of the sixth lens, f7 is a focal length of the seventh lens, f8 is a focal length of the eighth lens, and f9 is a focal length of the ninth lens. v1 is Abbe number of the first lens, v3 is Abbe number of the third lens, and v5 is Abbe number of the fifth lens. TTL is a distance from an object side surface of the first lens to an image plane, and BFL is a distance from an image side surface of the ninth lens to the image plane. IMH is a maximum effective image height of the imaging plane and is equal to one half of a diagonal length of the image plane, (e.g., equal to one half of a diagonal length of the effective imaging area of the imaging surface of the image sensor), FOV is an angle of view of the optical imaging system, and Fno is an F number of the optical imaging system. ΣCT is a sum of optical axis thicknesses of the first to ninth lenses, ΣAT is a sum of optical axis intervals of the first to ninth lenses, T1 is an optical axis thickness of the first lens, and T9 is an optical axis thickness of the ninth lens.

Hereinafter, various embodiments of the example optical imaging system, in accordance with one or more embodiments, will be described.

Figure 2:
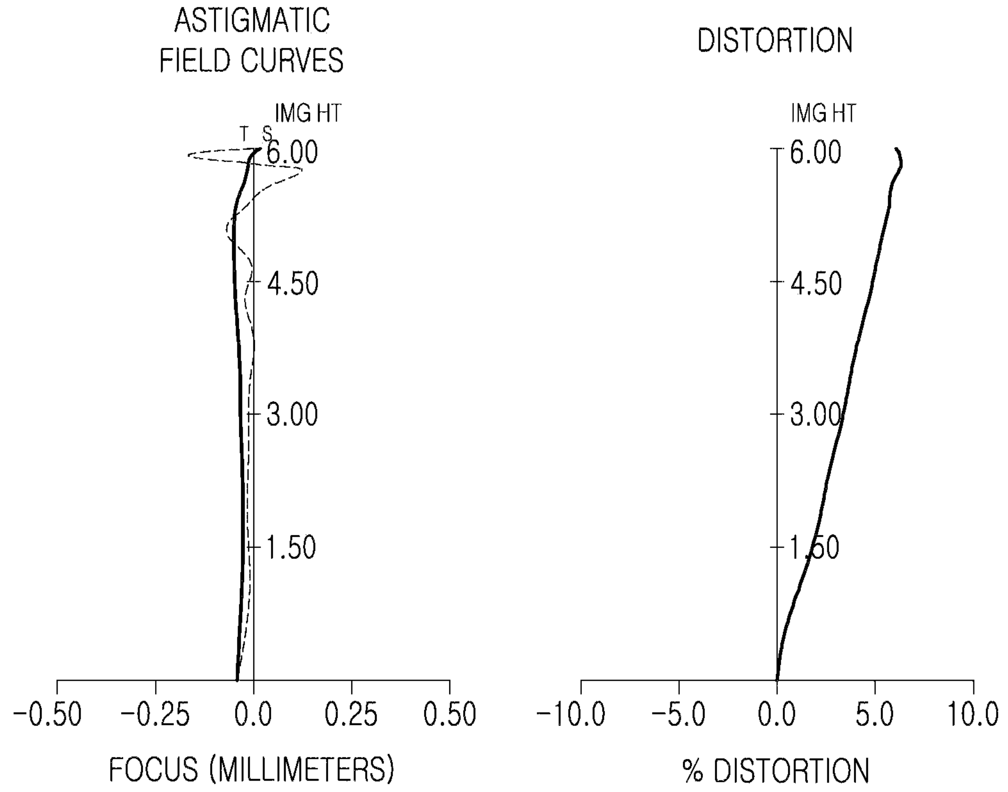
FIG. 2 illustrates an aberration curve of the example optical imaging system illustrated in FIG. 1.

FIG. 1 illustrates a configuration diagram of an example optical imaging system, in accordance with one or more embodiments, and FIG. 2 illustrates an aberration curve of the example optical imaging system illustrated in FIG. 1.

Referring to FIG. 1, an optical imaging system 100, according to a first embodiment, may include a first lens 101, a second lens 102, a third lens 103, a fourth lens 104, a fifth lens 105, a sixth lens 106, a seventh lens 107, an eighth lens 108, and a ninth lens 109, sequentially arranged from an object side to an imaging side.

The first lens 101 may have positive refractive power, a first surface of the first lens 101 may be convex in a paraxial region, and a second surface of the first lens may be concave in the paraxial region.

The second lens 102 may have negative refractive power, a first surface of the second lens 102 may be convex in the paraxial region, and a second surface of the second lens may be concave in the paraxial region.

The third lens 103 may have positive refractive power, and first and second surfaces of the third lens 103 may be convex in the paraxial region.

The fourth lens 104 may have negative refractive power, and first and second surfaces of the fourth lens 104 may be concave in the paraxial region.

The fifth lens 105 may have positive refractive power, a first surface of the fifth lens 105 may be convex in the paraxial region, and a second surface of the fifth lens may be concave in the paraxial region.

The sixth lens 106 may have negative refractive power, a first surface of the sixth lens 106 may be convex in the paraxial region, and a second surface of the sixth lens may be concave in the paraxial region.

The seventh lens 107 may have positive refractive power, a first surface of the seventh lens 107 may be convex in the paraxial region, and a second surface of the seventh lens may be concave in the paraxial region.

The eighth lens 108 may have positive refractive power, a first surface of the eighth lens 108 may be convex in the paraxial region, and a second surface of the eight lens may be concave in the paraxial region.

The ninth lens 109 may have negative refractive power, and first and second surfaces of the ninth lens 109 may be concave in the paraxial region.

The optical imaging system 100 according to the first embodiment may include a plastic lens. In an example, all of the first to ninth lenses may be formed of a plastic material.

Additionally, the optical imaging system 100 according to the first embodiment may include a stop (not illustrated), an infrared cut-off filter F, and an image sensor S. In an example, the stop may be disposed between the second lens 102 and the third lens 103.

Table 1 illustrates properties of the optical imaging system according to the first embodiment.

TABLE 1

| Surface No. | | Curvature Radius | Thickness/ Distance | Refractive Index | Abbe No. |
|---|---|---|---|---|---|
| 0 | Object | Infinity | | | |
| 1 | 1st Lens | 2.31 | 0.921 | 1.544 | 56.0 |
| 2 | | 7.84 | 0.149 | | |
| 3 | 2nd Lens | 10.32 | 0.281 | 1.680 | 18.2 |
| 4 | | 5.40 | 0.289 | | |
| 5 | 3rd Lens | 19.09 | 0.394 | 1.535 | 55.7 |
| 6 | | −351.04 | 0.100 | | |
| 7 | 4th Lens | −45.48 | 0.280 | 1.680 | 18.2 |
| 8 | | 45.85 | 0.100 | | |
| 9 | 5th Lens | 11.40 | 0.364 | 1.567 | 37.4 |
| 10 | | 22.90 | 0.481 | | |
| 11 | 6th Lens | 55.37 | 0.280 | 1.614 | 25.9 |
| 12 | | 6.44 | 0.101 | | |
| 13 | 7th Lens | 5.47 | 0.400 | 1.535 | 55.7 |
| 14 | | 7.00 | 0.126 | | |
| 15 | 8th Lens | 2.55 | 0.559 | 1.567 | 37.4 |
| 16 | | 12.91 | 0.966 | | |
| 17 | 9th Lens | −19.61 | 0.353 | 1.535 | 55.7 |
| 18 | | 2.89 | 0.250 | | |
| 19 | IR cut Filter | Infinity | 0.210 | 1.517 | 64.2 |
| 20 | | Infinity | 0.400 | | |
| 21 | Image | Infinity | | | |

Table 2 illustrates aspherical surface values of the optical imaging system according to the first embodiment.

TABLE 2

| | 1 | 2 | 3 | 4 | 5 | 6 | 7 | 8 | 9 |
|---|---|---|---|---|---|---|---|---|---|
| K | −1.023 | 6.873 | 31.340 | 6.291 | 97.564 | −99.000 | 26.703 | −50.763 | −17.523 |
| A | 0.010 | −0.014 | −0.037 | −0.004 | −0.011 | −0.012 | −0.030 | −0.039 | −0.068 |
| B | 0.021 | −0.044 | 0.110 | −0.146 | −0.099 | −0.148 | 0.113 | 0.055 | 0.076 |
| C | −0.130 | 0.273 | −0.504 | 1.328 | 0.486 | 1.055 | −0.575 | −0.017 | −0.127 |
| D | 0.438 | −0.907 | 1.858 | −6.477 | −1.398 | −4.624 | 1.923 | −0.393 | 0.089 |
| E | −0.918 | 2.027 | −4.713 | 20.721 | 2.284 | 13.046 | −4.605 | 1.476 | 0.110 |
| F | 1.290 | −3.184 | 8.401 | −45.719 | −1.385 | −24.972 | 8.008 | −2.924 | −0.383 |
| G | −1.262 | 3.587 | −10.743 | 71.547 | −2.395 | 33.487 | −10.209 | 3.749 | 0.524 |
| H | 0.878 | −2.924 | 9.953 | −80.623 | 6.959 | −31.994 | 9.583 | −3.311 | −0.449 |
| J | −0.436 | 1.724 | −6.679 | 65.657 | −8.614 | 21.872 | −6.601 | 2.061 | 0.265 |
| L | 0.154 | −0.727 | 3.208 | −38.307 | 6.506 | −10.606 | 3.291 | −0.904 | −0.110 |
| M | −0.038 | 0.213 | −1.074 | 15.618 | −3.176 | 3.557 | −1.155 | 0.274 | 0.032 |
| N | 0.006 | −0.041 | 0.238 | −4.227 | 0.982 | −0.784 | 0.270 | −0.054 | −0.006 |
| O | −0.001 | 0.005 | −0.031 | 0.682 | −0.176 | 0.102 | −0.038 | 0.006 | 0.001 |
| P | 0.000 | 0.000 | 0.002 | −0.050 | 0.014 | −0.006 | 0.002 | 0.000 | 0.000 |

| | 10 | 11 | 12 | 13 | 14 | 15 | 16 | 17 | 18 |
|---|---|---|---|---|---|---|---|---|---|
| K | 25.894 | 99.000 | −2.442 | −1.013 | 1.282 | −1.014 | 7.417 | 9.187 | −0.892 |
| A | −0.039 | −0.104 | −0.183 | −0.083 | −0.054 | −0.031 | 0.052 | −0.076 | −0.086 |
| B | 0.008 | 0.162 | 0.225 | 0.089 | 0.001 | −0.021 | −0.039 | 0.018 | 0.026 |
| C | 0.047 | −0.290 | −0.360 | −0.169 | −0.003 | 0.031 | 0.025 | 0.001 | −0.006 |
| D | −0.212 | 0.449 | 0.485 | 0.211 | 0.011 | −0.023 | −0.014 | −0.001 | 0.001 |
| E | 0.439 | −0.527 | −0.477 | −0.166 | −0.010 | 0.011 | 0.006 | 0.000 | 0.000 |
| F | −0.577 | 0.446 | 0.339 | 0.087 | 0.005 | −0.003 | −0.002 | 0.000 | 0.000 |
| G | 0.525 | −0.273 | −0.177 | −0.032 | −0.001 | 0.001 | 0.000 | 0.000 | 0.000 |
| H | −0.340 | 0.121 | 0.069 | 0.008 | 0.000 | 0.000 | 0.000 | 0.000 | 0.000 |
| J | 0.158 | −0.038 | −0.020 | −0.001 | 0.000 | 0.000 | 0.000 | 0.000 | 0.000 |
| L | −0.052 | 0.009 | 0.004 | 0.000 | 0.000 | 0.000 | 0.000 | 0.000 | 0.000 |
| M | 0.012 | −0.001 | −0.001 | 0.000 | 0.000 | 0.000 | 0.000 | 0.000 | 0.000 |
| N | −0.002 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 |

Figure 3:
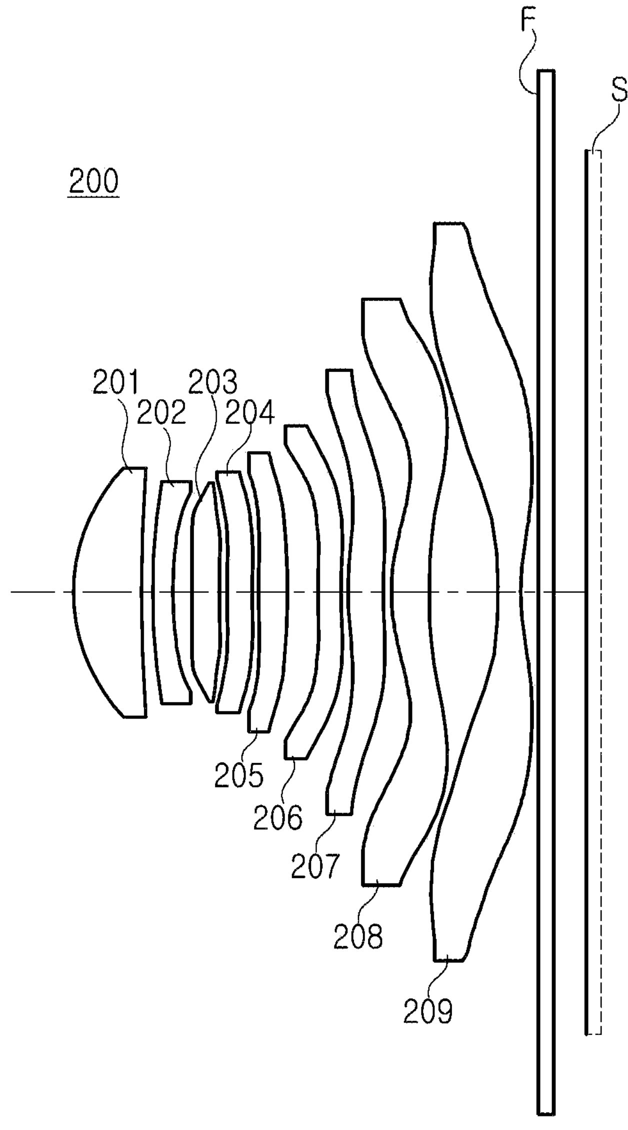
FIG. 3 illustrates a configuration diagram of an example optical imaging system, in accordance with a second embodiment.
Figure 4:
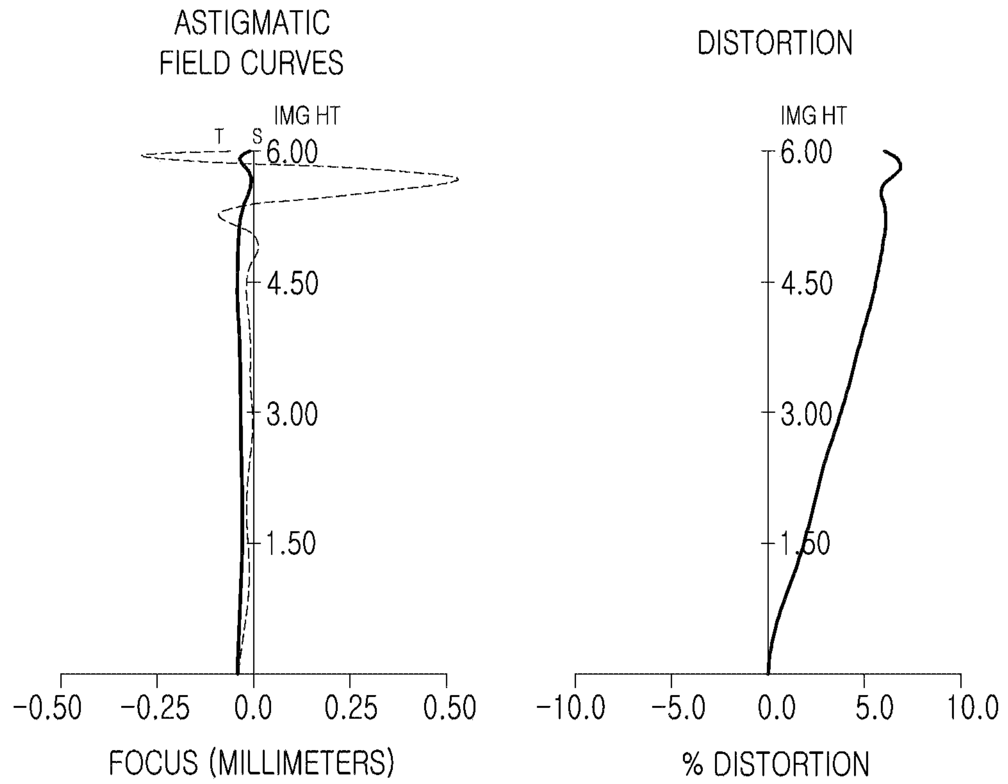
FIG. 4 illustrates an aberration curve of the example optical imaging system illustrated in FIG. 3.

FIG. 3 illustrates a configuration diagram of an example optical imaging system according to a second embodiment, and FIG. 4 illustrates an aberration curve of the example optical imaging system illustrated in FIG. 3.

An optical imaging system 200, according to a second embodiment, may include a first lens 201, a second lens 202, a third lens 203, a fourth lens 204, a fifth lens 205, a sixth lens 206, a seventh lens 207, an eighth lens 208, and a ninth lens 209, sequentially arranged from an object side to an imaging side.

The first lens 201 may have positive refractive power, a first surface of the first lens 201 may be convex in a paraxial region, and a second surface of the first lens may be concave in the paraxial region.

The second lens 202 may have negative refractive power, a first surface of the second lens 202 may be convex in the paraxial region, and a second surface of the second lens may be concave in the paraxial region.

The third lens 203 may have positive refractive power, a first surface of the third lens 203 may be convex in the paraxial region, and a second surface of the third lens may be concave in the paraxial region.

The fourth lens 204 may have positive refractive power, a first surface of the fourth lens 204 may be concave in the paraxial region, and a second surface of the fourth lens may be convex in the paraxial region.

The fifth lens 205 may have positive refractive power, a first surface of the fifth lens 205 may be convex in the paraxial region, and a second surface of the fifth lens may be concave in the paraxial region.

The sixth lens 206 may have negative refractive power, a first surface of the sixth lens 206 may be convex in the paraxial region, and a second surface of the sixth lens may be concave in the paraxial region.

The seventh lens 207 may have positive refractive power, a first surface of the seventh lens 207 may be convex in the paraxial region, and a second surface of the seventh may be concave in the paraxial region.

The eighth lens 208 may have positive refractive power, a first surface of the eighth lens 208 may be convex in the paraxial region, and a second surface of the eight lens may be concave in the paraxial region.

The ninth lens 209 may have negative refractive power, and first and second surfaces of the ninth lens 209 may be concave in the paraxial region.

The optical imaging system 200 according to the second embodiment may include a plastic lens. In an example, all of the first to ninth lenses may be formed of a plastic material.

Additionally, the example optical imaging system 200 according to the second embodiment may include a stop (not illustrated), an infrared cut-off filter F, and an image sensor S. In a non-limited example, the stop may be disposed between the second lens 202 and the third lens 203.

Table 3 illustrates properties of the optical imaging system according to the second embodiment.

TABLE 3

| Surface No. | | Curvature Radius | Thickness/ Distance | Refractive Index | Abbe No. |
|---|---|---|---|---|---|
| 0 | Object | Infinity | | | |
| 1 | 1st Lens | 2.32 | 0.941 | 1.544 | 56.0 |
| 2 | | 8.48 | 0.154 | | |
| 3 | 2nd Lens | 11.43 | 0.280 | 1.680 | 18.2 |
| 4 | | 5.29 | 0.290 | | |
| 5 | 3rd Lens | 17.67 | 0.374 | 1.535 | 55.7 |
| 6 | | 46.89 | 0.101 | | |
| 7 | 4th Lens | −712.00 | 0.342 | 1.614 | 25.9 |
| 8 | | −332.00 | 0.107 | | |

TABLE 3-continued

| Surface No. | | Curvature Radius | Thickness/ Distance | Refractive Index | Abbe No. |
|---|---|---|---|---|---|
| 9 | $5^{th}$ Lens | 15.88 | 0.356 | 1.567 | 37.4 |
| 10 | | 28.13 | 0.470 | | |
| 11 | $6^{th}$ Lens | 43.30 | 0.280 | 1.635 | 24.0 |
| 12 | | 4.76 | 0.100 | | |
| 13 | $7^{th}$ Lens | 4.25 | 0.486 | 1.535 | 55.7 |
| 14 | | 6.95 | 0.111 | | |
| 15 | $8^{th}$ Lens | 2.53 | 0.523 | 1.567 | 37.4 |
| 16 | | 13.12 | 0.948 | | |
| 17 | $9^{th}$ Lens | −20.92 | 0.316 | 1.535 | 55.7 |
| 18 | | 2.89 | 0.250 | | |
| 19 | IR cut Filter | Infinity | 0.210 | 1.5168 | 64.2 |
| 20 | | Infinity | 0.404 | | |
| 21 | Image | Infinity | | | |

Table 4 illustrates aspherical surface values of the example optical imaging system according to the second embodiment.

TABLE 4

| | 1 | 2 | 3 | 4 | 5 | 6 | 7 | 8 | 9 |
|---|---|---|---|---|---|---|---|---|---|
| K | −1.022 | 6.767 | 31.485 | 6.121 | 88.327 | −91.406 | 99.000 | −99.000 | −7.719 |
| A | 0.008 | −0.014 | −0.036 | −0.004 | −0.017 | −0.029 | −0.034 | −0.036 | −0.063 |
| B | 0.033 | −0.030 | 0.114 | −0.141 | −0.041 | 0.018 | 0.135 | 0.036 | 0.096 |
| C | −0.176 | 0.187 | −0.539 | 1.273 | 0.219 | −0.016 | −0.692 | 0.044 | −0.336 |
| D | 0.551 | −0.618 | 1.973 | −6.177 | −0.797 | −0.087 | 2.436 | −0.515 | 0.907 |
| E | −1.104 | 1.379 | −4.938 | 19.613 | 2.047 | 0.254 | −6.024 | 1.661 | −1.812 |
| F | 1.503 | −2.163 | 8.673 | −42.832 | −3.759 | −0.169 | 10.538 | −3.163 | 2.640 |
| G | −1.438 | 2.430 | −10.932 | 66.195 | 4.897 | −0.422 | −13.229 | 4.019 | −2.802 |
| H | 0.983 | −1.974 | 9.993 | −73.515 | −4.426 | 1.155 | 12.018 | −3.565 | 2.160 |
| J | −0.483 | 1.160 | −6.626 | 58.893 | 2.651 | −1.367 | −7.899 | 2.245 | −1.203 |
| L | 0.169 | −0.488 | 3.150 | −33.740 | −0.934 | 0.970 | 3.714 | −1.002 | 0.477 |
| M | −0.041 | 0.143 | −1.045 | 13.484 | 0.105 | −0.437 | −1.216 | 0.310 | −0.131 |
| N | 0.007 | −0.028 | 0.230 | −3.570 | 0.053 | 0.123 | 0.263 | −0.063 | 0.023 |
| O | −0.001 | 0.003 | −0.030 | 0.563 | −0.023 | −0.020 | −0.034 | 0.008 | −0.002 |
| P | 0.000 | 0.000 | 0.002 | −0.040 | 0.003 | 0.001 | 0.002 | 0.000 | 0.000 |

| | 10 | 11 | 12 | 13 | 14 | 15 | 16 | 17 | 18 |
|---|---|---|---|---|---|---|---|---|---|
| K | 36.250 | 99.000 | −2.525 | −1.108 | 1.662 | −1.013 | 7.658 | 9.002 | −0.892 |
| A | −0.037 | −0.101 | −0.155 | −0.037 | −0.042 | −0.043 | 0.045 | −0.071 | −0.080 |
| B | 0.034 | 0.124 | 0.064 | −0.104 | −0.032 | −0.001 | −0.023 | 0.012 | 0.021 |
| C | −0.108 | −0.169 | 0.013 | 0.190 | 0.043 | 0.012 | 0.011 | 0.004 | −0.003 |
| D | 0.238 | 0.250 | −0.003 | −0.180 | −0.026 | −0.011 | −0.006 | −0.002 | 0.000 |
| E | −0.386 | −0.321 | −0.056 | 0.112 | 0.010 | 0.006 | 0.003 | 0.000 | 0.000 |
| F | 0.447 | 0.297 | 0.080 | −0.049 | −0.002 | −0.002 | −0.001 | 0.000 | 0.000 |
| G | −0.370 | −0.193 | −0.058 | 0.016 | 0.000 | 0.000 | 0.000 | 0.000 | 0.000 |
| H | 0.219 | 0.089 | 0.027 | −0.004 | 0.000 | 0.000 | 0.000 | 0.000 | 0.000 |
| J | −0.093 | −0.029 | −0.009 | 0.001 | 0.000 | 0.000 | 0.000 | 0.000 | 0.000 |
| L | 0.028 | 0.006 | 0.002 | 0.000 | 0.000 | 0.000 | 0.000 | 0.000 | 0.000 |
| M | −0.006 | −0.001 | 0.000 | 0.000 | 0.000 | 0.000 | 0.000 | 0.000 | 0.000 |
| N | 0.001 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 |

Figure 5:
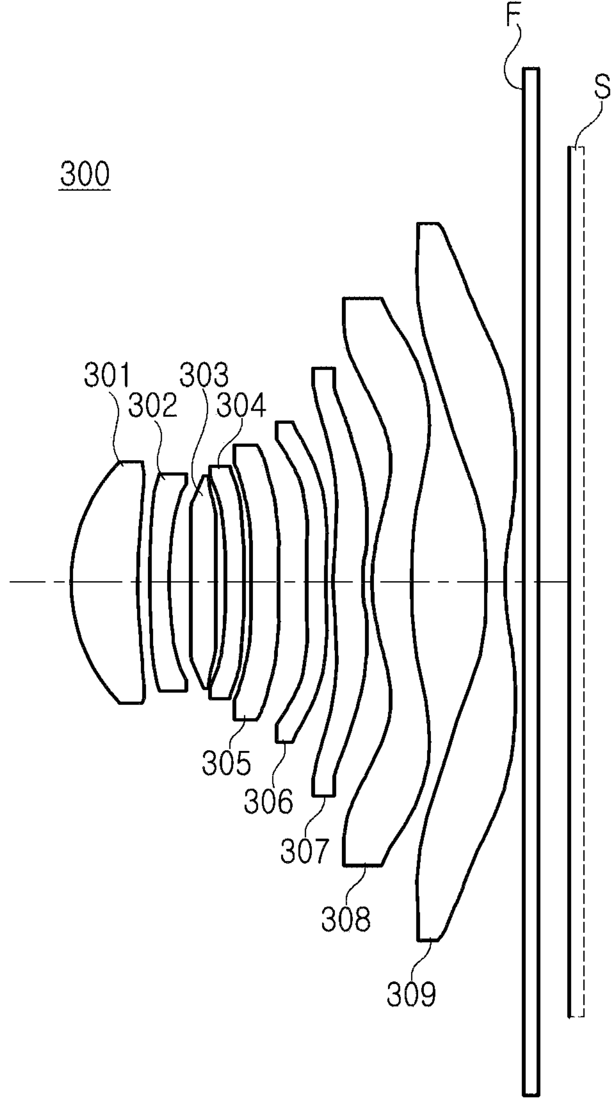
FIG. 5 illustrates a configuration diagram of an example optical imaging system, in accordance with a third embodiment.
Figure 6:
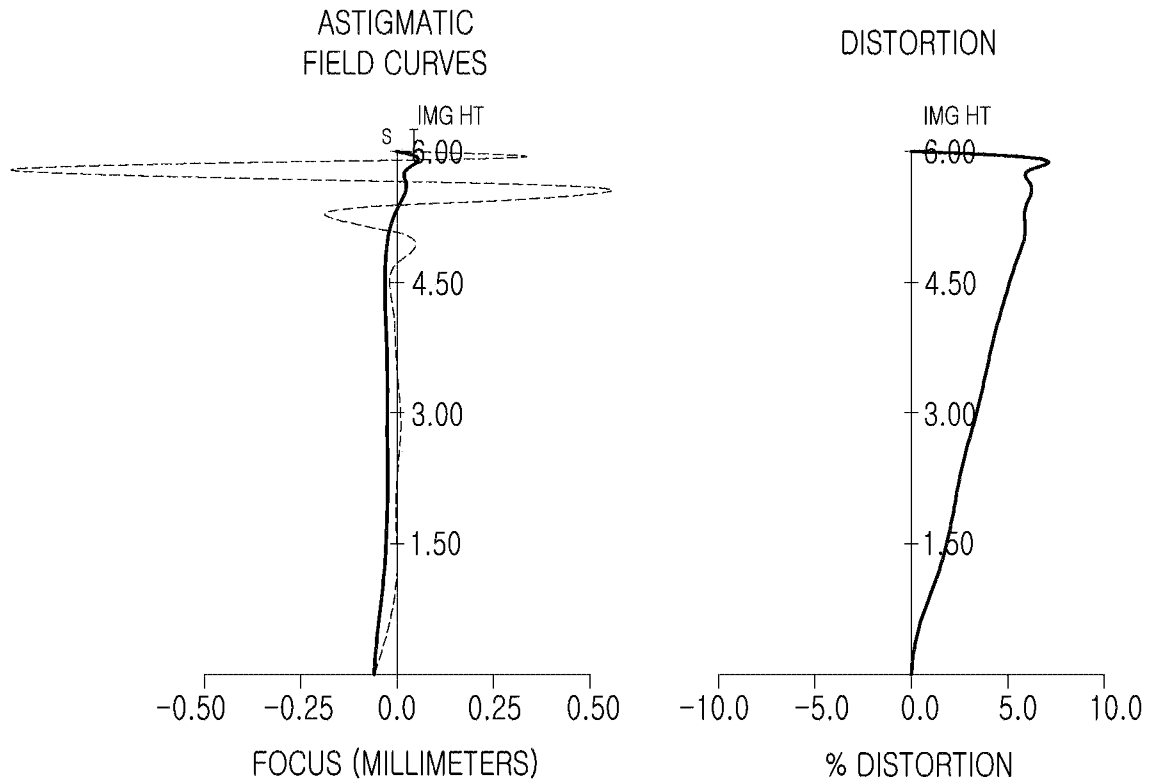
FIG. 6 illustrates an aberration curve of the example optical imaging system illustrated in FIG. 5.

FIG. 5 is a configuration diagram of an example optical imaging system according to a third embodiment, and FIG. 6 is an aberration curve of the example optical imaging system illustrated in FIG. 5.

An optical imaging system 300 according to a third embodiment may include a first lens 301, a second lens 302, a third lens 303, a fourth lens 304, a fifth lens 305, a sixth lens 306, a seventh lens 307, an eighth lens 308, and a ninth lens 309, sequentially arranged from an object side to an imaging side.

The first lens 301 may have positive refractive power, a first surface of the first lens 301 may be convex in the paraxial region, and a second surface of the first lens may be concave in the paraxial region.

The second lens 302 may have negative refractive power, a first surface of the second lens 302 may be convex in the paraxial region, and a second surface of the second lens may be concave in the paraxial region.

The third lens 303 may have positive refractive power, and first and second surfaces of the third lens 303 may be convex in the paraxial region.

The fourth lens 304 may have negative refractive power, a first surface of the fourth lens 304 may be concave in the paraxial region, and a second surface of the fourth lens may be convex in the paraxial region.

The fifth lens 305 may have negative refractive power, a first surface of the fifth lens 305 may be convex in the paraxial region, and a second surface of the fifth lens may be concave in the paraxial region.

The sixth lens 306 may have negative refractive power, a first surface of the sixth lens 306 may be convex in the paraxial region, and a second surface of the sixth lens may be concave in the paraxial region.

The seventh lens 307 may have positive refractive power, a first surface of the seventh lens 307 may be convex in the paraxial region, and a second surface of the seventh lens may be concave in the paraxial region.

The eighth lens 308 may have positive refractive power, a first surface of the eighth lens 308 may be convex in the paraxial region, and a second surface of the eight lens may be concave in the paraxial region.

The ninth lens 309 may have negative refractive power, and first and second surfaces of the ninth lens 309 may be concave in the paraxial region.

The optical imaging system 300 according to the third embodiment may include a plastic lens. In a non-limited example, all of the first to ninth lenses may be formed of a plastic material.

Additionally, the optical imaging system 300 according to the third embodiment may include a stop (not illustrated), an infrared cut-off filter F, and an image sensor S. In an example, the stop may be disposed between the second lens 302 and the third lens 303.

Table 5 illustrates properties of the optical imaging system according to the third embodiment.

TABLE 5

| Surface No. | | Curvature Radius | Thickness/ Distance | Refractive Index | Abbe No. |
|---|---|---|---|---|---|
| 0 | Object | Infinity | | | |
| 1 | $1^{st}$ Lens | 2.32 | 0.948 | 1.544 | 56.0 |
| 2 | | 8.20 | 0.164 | | |
| 3 | $2^{nd}$ Lens | 10.86 | 0.275 | 1.680 | 18.2 |
| 4 | | 5.50 | 0.290 | | |
| 5 | $3^{rd}$ Lens | 19.34 | 0.377 | 1.535 | 55.7 |
| 6 | | −69.89 | 0.106 | | |
| 7 | $4^{th}$ Lens | −26.19 | 0.260 | 1.661 | 20.4 |

TABLE 5-continued

| Surface No. | | Curvature Radius | Thickness/ Distance | Refractive Index | Abbe No. |
|---|---|---|---|---|---|
| 8 | | −120.56 | 0.119 | | |
| 9 | $5^{th}$ Lens | 403.00 | 0.379 | 1.614 | 25.9 |
| 10 | | 228.67 | 0.408 | | |
| 11 | $6^{th}$ Lens | 24.70 | 0.260 | 1.614 | 25.9 |
| 12 | | 5.32 | 0.102 | | |
| 13 | $7^{th}$ Lens | 4.73 | 0.445 | 1.535 | 55.7 |
| 14 | | 6.82 | 0.105 | | |
| 15 | $8^{th}$ Lens | 2.50 | 0.557 | 1.567 | 37.4 |
| 16 | | 13.13 | 1.049 | | |
| 17 | $9^{th}$ Lens | −19.96 | 0.262 | 1.535 | 55.7 |
| 18 | | 2.93 | 0.265 | | |
| 19 | IR cut Filter | Infinity | 0.210 | 1.5168 | 64.2 |
| 20 | | Infinity | 0.365 | | |
| 21 | Image | Infinity | 0.000 | | |

Table 6 illustrates aspherical surface values of the example optical imaging system according to the third embodiment.

TABLE 6

| | 1 | 2 | 3 | 4 | 5 | 6 | 7 | 8 | 9 |
|---|---|---|---|---|---|---|---|---|---|
| K | −1.026 | 6.833 | 31.879 | 6.010 | 74.500 | 59.411 | 46.849 | −99.000 | −99.000 |
| A | 0.005 | −0.012 | −0.037 | −0.005 | −0.032 | −0.028 | −0.044 | −0.046 | −0.066 |
| B | 0.044 | −0.047 | 0.143 | −0.133 | 0.143 | 0.011 | 0.201 | 0.095 | 0.114 |
| C | −0.203 | 0.283 | −0.819 | 1.242 | −1.036 | 0.080 | −0.979 | −0.166 | −0.415 |
| D | 0.604 | −0.960 | 3.317 | −6.071 | 4.778 | −0.543 | 3.434 | 0.091 | 1.189 |
| E | −1.205 | 2.175 | −8.937 | 19.212 | −14.984 | 1.498 | −8.698 | 0.290 | −2.493 |
| F | 1.672 | −3.464 | 16.671 | −41.590 | 33.156 | −2.405 | 15.783 | −0.914 | 3.747 |
| G | −1.653 | 3.978 | −22.133 | 63.571 | −52.877 | 2.402 | −20.614 | 1.399 | −4.046 |
| H | 1.181 | −3.333 | 21.210 | −69.752 | 61.386 | −1.418 | 19.472 | −1.391 | 3.154 |
| J | −0.610 | 2.039 | −14.708 | 55.164 | −51.858 | 0.333 | −13.287 | 0.958 | −1.772 |
| L | 0.226 | −0.900 | 7.309 | −31.171 | 31.505 | 0.162 | 6.474 | −0.461 | 0.709 |
| M | −0.058 | 0.278 | −2.537 | 12.271 | −13.394 | −0.167 | −2.193 | 0.153 | −0.197 |
| N | 0.010 | −0.057 | 0.584 | −3.196 | 3.778 | 0.063 | 0.490 | −0.033 | 0.036 |
| O | −0.001 | 0.007 | −0.080 | 0.495 | −0.635 | −0.012 | −0.065 | 0.0040 | −0.004 |
| P | 0.000 | 0.000 | 0.005 | −0.034 | 0.048 | 0.001 | 0.004 | 0.000 | 0.000 |

| | 10 | 11 | 12 | 13 | 14 | 15 | 16 | 17 | 18 |
|---|---|---|---|---|---|---|---|---|---|
| K | 99.000 | 99.000 | −1.507 | −0.467 | 1.647 | −1.015 | 7.506 | 9.909 | −0.892 |
| A | −0.040 | −0.103 | −0.140 | −0.017 | −0.038 | −0.047 | 0.043 | −0.070 | −0.078 |
| B | 0.037 | 0.143 | −0.003 | −0.172 | −0.046 | 0.003 | −0.017 | 0.009 | 0.017 |
| C | −0.120 | −0.237 | 0.129 | 0.290 | 0.060 | 0.010 | 0.005 | 0.007 | −0.001 |
| D | 0.300 | 0.387 | −0.114 | −0.259 | −0.038 | −0.012 | −0.003 | −0.003 | −0.001 |
| E | −0.538 | −0.480 | 0.012 | 0.146 | 0.014 | 0.007 | 0.002 | 0.001 | 0.000 |
| F | 0.683 | 0.411 | 0.049 | −0.055 | −0.003 | −0.002 | −0.001 | 0.000 | 0.000 |
| G | −0.616 | −0.243 | −0.045 | 0.015 | 0.000 | 0.000 | 0.000 | 0.000 | 0.000 |
| H | 0.400 | 0.100 | 0.022 | −0.003 | 0.000 | 0.000 | 0.000 | 0.000 | 0.000 |
| J | −0.188 | −0.029 | −0.007 | 0.000 | 0.000 | 0.000 | 0.000 | 0.000 | 0.000 |
| L | 0.063 | 0.006 | 0.002 | 0.000 | 0.000 | 0.000 | 0.000 | 0.000 | 0.000 |
| M | −0.015 | −0.001 | 0.000 | 0.000 | 0.000 | 0.000 | 0.000 | 0.000 | 0.000 |
| N | 0.002 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 |

Figure 7:
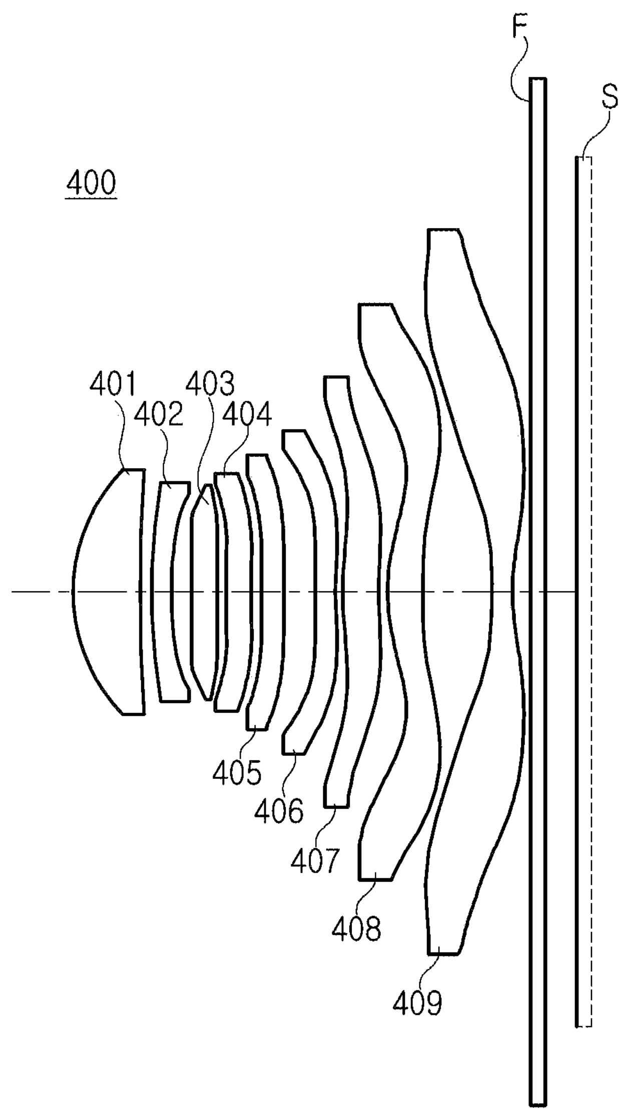
FIG. 7 illustrates a configuration diagram of an example optical imaging system, in accordance with a fourth embodiment.
Figure 8:
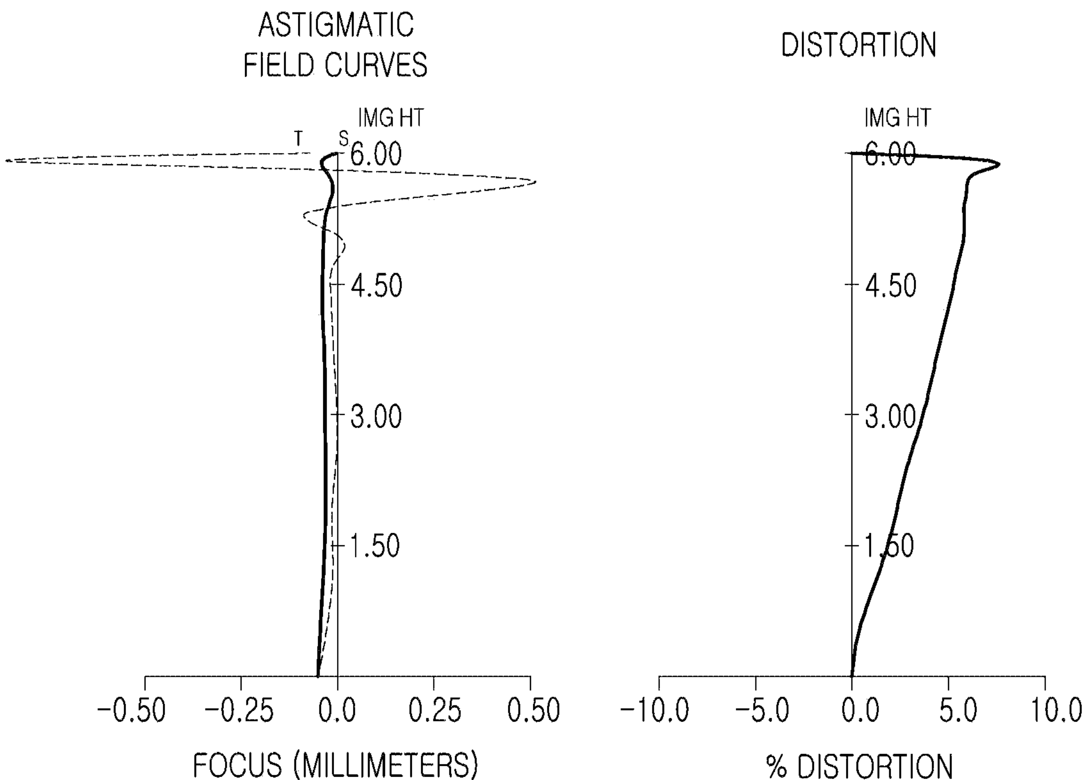
FIG. 8 illustrates an aberration curve of the example optical imaging system illustrated in FIG. 7.

FIG. 7 illustrates a configuration diagram of an example optical imaging system according to a fourth embodiment, and FIG. 8 illustrates an aberration curve of the example optical imaging system illustrated in FIG. 7.

An optical imaging system 400 according to a fourth embodiment may include a first lens 401, a second lens 402, a third lens 403, a fourth lens 404, a fifth lens 405, a sixth lens 406, a seventh lens 407, an eighth lens 408, and a ninth lens 409, sequentially arranged from an object side to an imaging side.

The first lens 401 may have positive refractive power, a first surface of the first lens 401 may be convex in the paraxial region, and a second surface of the first lens may be concave in the paraxial region.

The second lens 402 may have negative refractive power, a first surface of the second lens 402 may be convex in the paraxial region, and a second surface of the second lens may be concave in the paraxial region.

The third lens 403 may have positive refractive power, a first surface of the third lens 403 may be convex in the paraxial region, and a second surface of the third lens may be concave in the paraxial region.

The fourth lens 404 may have positive refractive power, a first surface of the fourth lens 404 may be concave in the paraxial region, and a second surface of the fourth lens may be convex in the paraxial region.

The fifth lens 405 may have negative refractive power, a first surface of the fifth lens 405 may be convex in the paraxial region, and a second surface of the fifth lens may be concave in the paraxial region.

The sixth lens 406 may have negative refractive power, a first surface of the sixth lens 406 may be convex in the paraxial region, and a second surface of the sixth lens may be concave in the paraxial region.

The seventh lens 407 may have positive refractive power, a first surface of the seventh lens 407 may be convex in the paraxial region, and a second surface of the seventh lens may be concave in the paraxial region.

The eighth lens 408 may have positive refractive power, a first surface of the eighth lens 408 may be convex in the paraxial region, and a second surface of the eight lens may be concave in the paraxial region.

The ninth lens 409 may have negative refractive power, and first and second surfaces of the ninth lens 409 may be concave in the paraxial region.

The optical imaging system 400 according to the fourth embodiment may include a plastic lens. In an example, all of the first to ninth lenses may be formed of a plastic material.

Additionally, the optical imaging system 400 according to the fourth embodiment may include a stop (not illustrated), an infrared cut-off filter F, and an image sensor S. In an example, the stop may be disposed between the second lens 402 and the third lens 403.

Table 7 illustrates properties of the optical imaging system according to the fourth embodiment.

TABLE 7

| Surface No. | | Curvature Radius | Thickness/ Distance | Refractive Index | Abbe No. |
|---|---|---|---|---|---|
| 0 | Object | Infinity | | | |
| 1 | $1^{st}$ Lens | 2.31 | 0.948 | 1.544 | 56.0 |
| 2 | | 8.57 | 0.161 | | |
| 3 | $2^{nd}$ Lens | 11.59 | 0.279 | 1.680 | 18.2 |
| 4 | | 5.25 | 0.294 | | |
| 5 | $3^{rd}$ Lens | 17.43 | 0.363 | 1.535 | 55.7 |
| 6 | | 71.53 | 0.122 | | |
| 7 | $4^{th}$ Lens | −712.20 | 0.353 | 1.614 | 25.9 |
| 8 | | −69.21 | 0.117 | | |
| 9 | $5^{th}$ Lens | 24.30 | 0.332 | 1.567 | 37.4 |
| 10 | | 20.80 | 0.435 | | |
| 11 | $6^{th}$ Lens | 24.14 | 0.287 | 1.635 | 24.0 |
| 12 | | 4.53 | 0.100 | | |
| 13 | $7^{th}$ Lens | 4.11 | 0.510 | 1.544 | 56.0 |
| 14 | | 7.04 | 0.122 | | |
| 15 | $8^{th}$ Lens | 2.54 | 0.491 | 1.567 | 37.4 |
| 16 | | 13.11 | 0.975 | | |
| 17 | $9^{th}$ Lens | −20.79 | 0.289 | 1.535 | 55.7 |
| 18 | | 2.88 | 0.250 | | |
| 19 | IR cut Filter | Infinity | 0.210 | 1.5168 | 64.2 |
| 20 | | Infinity | 0.391 | | |
| 21 | Image | Infinity | | | |

Table 8 illustrates aspherical surface values of the example optical imaging system according to the fourth embodiment.

TABLE 8

| | 1 | 2 | 3 | 4 | 5 | 6 | 7 | 8 | 9 |
|---|---|---|---|---|---|---|---|---|---|
| K | −1.028 | 6.897 | 31.865 | 5.959 | 83.414 | 99.000 | 99.000 | −96.716 | 22.890 |
| A | 0.007 | −0.012 | −0.036 | −0.004 | −0.022 | −0.024 | −0.033 | −0.036 | −0.059 |
| B | 0.040 | −0.047 | 0.116 | −0.140 | −0.003 | −0.032 | 0.116 | 0.039 | 0.045 |
| C | −0.203 | 0.275 | −0.556 | 1.262 | 0.039 | 0.244 | −0.638 | 0.036 | −0.058 |
| D | 0.626 | −0.905 | 2.040 | −6.098 | −0.293 | −0.959 | 2.403 | −0.508 | 0.035 |
| E | −1.255 | 1.981 | −5.103 | 19.254 | 1.243 | 2.273 | −6.262 | 1.658 | −0.010 |
| F | 1.723 | −3.021 | 8.954 | −41.770 | −3.322 | −3.507 | 11.413 | −3.170 | 0.051 |
| G | −1.669 | 3.287 | −11.274 | 64.066 | 5.898 | 3.598 | −14.812 | 4.039 | −0.134 |
| H | 1.160 | −2.585 | 10.297 | −70.542 | −7.164 | −2.398 | 13.846 | −3.596 | 0.164 |
| J | −0.580 | 1.472 | −6.824 | 55.975 | 6.024 | 0.930 | −9.336 | 2.274 | −0.116 |
| L | 0.207 | −0.601 | 3.245 | −31.733 | −3.489 | −0.102 | 4.495 | −1.018 | 0.052 |
| M | −0.052 | 0.171 | −1.078 | 12.536 | 1.357 | −0.086 | −1.506 | 0.316 | −0.014 |
| N | 0.008 | −0.032 | 0.237 | −3.278 | −0.335 | 0.046 | 0.333 | −0.065 | 0.002 |
| O | −0.001 | 0.004 | −0.031 | 0.510 | 0.047 | −0.010 | −0.044 | 0.008 | 0.000 |
| P | 0.000 | 0.000 | 0.002 | −0.036 | −0.003 | 0.001 | 0.003 | 0.000 | 0.000 |
| | **10** | **11** | **12** | **13** | **14** | **15** | **16** | **17** | **18** |
| K | 23.174 | 46.032 | −2.323 | −1.070 | 1.735 | −1.013 | 7.371 | 9.061 | −0.892 |
| A | −0.039 | −0.104 | −0.150 | −0.027 | −0.039 | −0.044 | 0.044 | −0.071 | −0.079 |
| B | 0.005 | 0.123 | 0.031 | −0.148 | −0.043 | −0.001 | −0.022 | 0.012 | 0.020 |
| C | 0.040 | −0.152 | 0.083 | 0.270 | 0.060 | 0.013 | 0.010 | 0.004 | −0.003 |

TABLE 8-continued

| | | | | | | | | | |
|---|---|---|---|---|---|---|---|---|---|
| D | −0.159 | 0.218 | −0.080 | −0.262 | −0.042 | −0.012 | −0.006 | −0.002 | 0.000 |
| E | 0.3069 | −0.285 | −0.005 | 0.165 | 0.019 | 0.006 | 0.003 | 0.000 | 0.000 |
| F | −0.398 | 0.269 | 0.059 | −0.074 | −0.006 | −0.002 | −0.001 | 0.000 | 0.000 |
| G | 0.365 | −0.177 | −0.054 | 0.024 | 0.002 | 0.000 | 0.000 | 0.000 | 0.000 |
| H | −0.246 | 0.082 | 0.027 | −0.006 | 0.000 | 0.000 | 0.000 | 0.000 | 0.000 |
| J | 0.121 | −0.027 | −0.009 | 0.001 | 0.000 | 0.000 | 0.000 | 0.000 | 0.000 |
| L | −0.043 | 0.006 | 0.002 | 0.000 | 0.000 | 0.000 | 0.000 | 0.000 | 0.000 |
| M | 0.011 | −0.001 | 0.000 | 0.000 | 0.000 | 0.000 | 0.000 | 0.000 | 0.000 |
| N | −0.002 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 |

Figure 9:
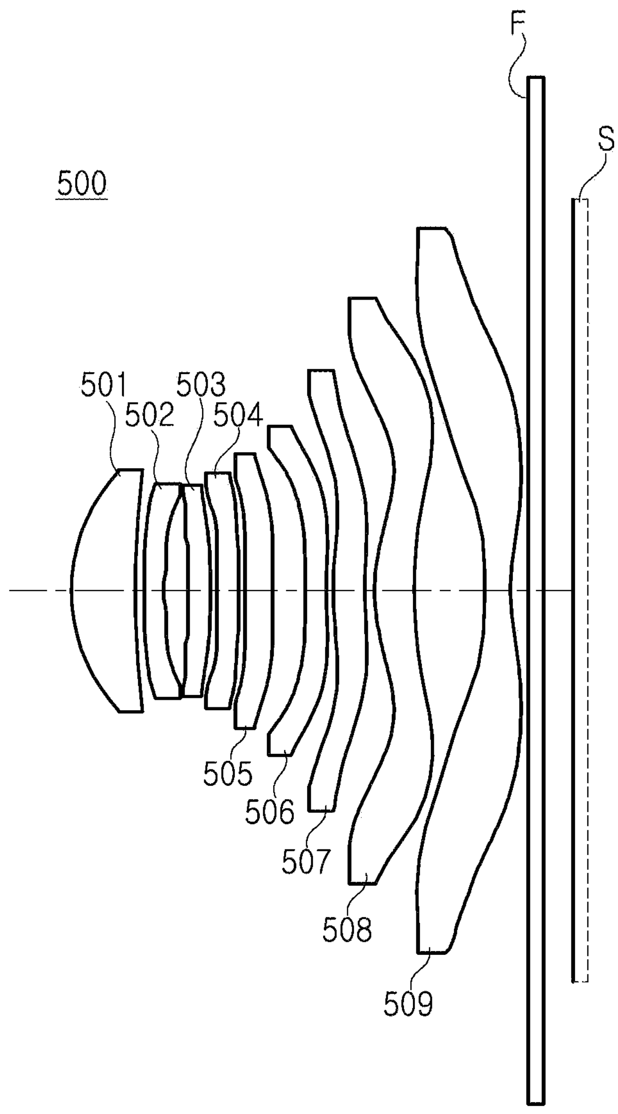
FIG. 9 illustrates a configuration diagram of an example optical imaging system in accordance with a fifth embodiment.
Figure 10:
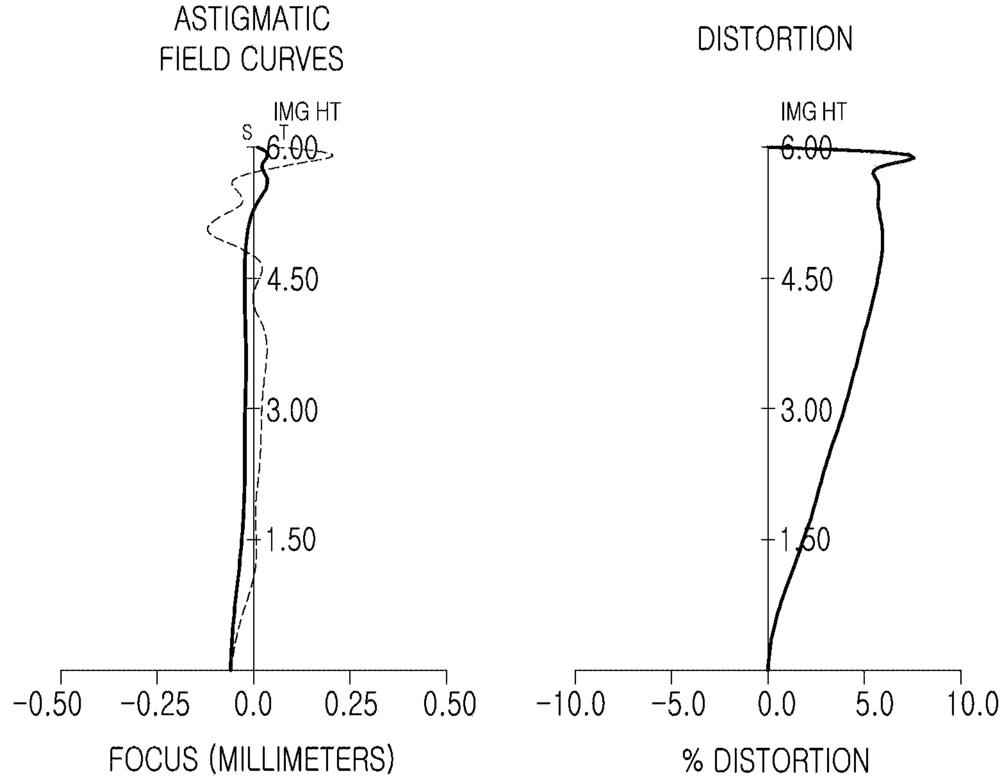
FIG. 10 illustrates an aberration curve of the example optical imaging system illustrated in FIG. 9.

FIG. 9 illustrates a configuration diagram of an example optical imaging system according to a fifth embodiment, and FIG. 10 illustrates an aberration curve of the example optical imaging system illustrated in FIG. 9.

An optical imaging system 500 according to a fifth embodiment may include a first lens 501, a second lens 502, a third lens 503, a fourth lens 504, a fifth lens 505, a sixth lens 506, a seventh lens 507, an eighth lens 508, and a ninth lens 509, sequentially arranged from an object side to an imaging side.

The first lens 501 may have positive refractive power, a first surface of the first lens 501 may be convex in the paraxial region, and a second surface of the first lens may be concave in the paraxial region.

The second lens 502 may have negative refractive power, a first surface of the second lens 502 may be convex in the paraxial region, and a second surface of the second lens may be concave in the paraxial region.

The third lens 503 may have negative refractive power, a first surface of the third lens 503 may be concave in the paraxial region, and a second surface of the third lens may be convex in the paraxial region.

The fourth lens 504 may have negative refractive power, and first and second surfaces of the fourth lens 504 may be concave in the paraxial region.

The fifth lens 505 may have positive refractive power, a first surface of the fifth lens 505 may be convex in the paraxial region, and a second surface of the fifth lens may be concave in the paraxial region.

The sixth lens 506 may have negative refractive power, a first surface of the sixth lens 506 may be convex in the paraxial region, and a second surface of the sixth lens may be concave in the paraxial region.

The seventh lens 507 may have positive refractive power, a first surface of the seventh lens 507 may be convex in the paraxial region, and a second surface of the seventh lens may be concave in the paraxial region.

The eighth lens 508 may have positive refractive power, a first surface of the eighth lens 508 may be convex in the paraxial region, and a second surface of the eighth lens may be concave in the paraxial region.

The ninth lens 509 may have negative refractive power, and first and second surfaces of the ninth lens 509 may be concave in the paraxial region.

The optical imaging system 500 according to the fifth embodiment may include a plastic lens. In an example, all of the first to ninth lenses may be formed of a plastic material.

Additionally, the optical imaging system 500 according to the fifth embodiment may include a stop (not illustrated), an infrared cut-off filter F, and an image sensor S. In an example, the stop may be disposed between the second lens 502 and the third lens 503.

Table 9 illustrates properties of the example optical imaging system according to the fifth embodiment.

TABLE 9

| Surface No. | | Curvature Radius | Thickness/ Distance | Refractive Index | Abbe No. |
|---|---|---|---|---|---|
| 0 | Object | Infinity | | | |
| 1 | 1st Lens | 2.33 | 0.909 | 1.544 | 56.0 |
| 2 | | 7.55 | 0.136 | | |
| 3 | 2nd Lens | 9.87 | 0.280 | 1.680 | 18.2 |
| 4 | | 6.48 | 0.321 | | |
| 5 | 3rd Lens | −531.00 | 0.321 | 1.535 | 55.7 |
| 6 | | −725.00 | 0.100 | | |
| 7 | 4th Lens | −100.66 | 0.285 | 1.680 | 18.2 |
| 8 | | 32.25 | 0.100 | | |
| 9 | 5th Lens | 11.47 | 0.420 | 1.567 | 37.4 |
| 10 | | 90.38 | 0.437 | | |
| 11 | 6th Lens | 74.28 | 0.280 | 1.639 | 23.5 |
| 12 | | 5.07 | 0.100 | | |
| 13 | 7th Lens | 4.39 | 0.444 | 1.535 | 55.7 |
| 14 | | 6.78 | 0.137 | | |
| 15 | 8th Lens | 2.52 | 0.561 | 1.567 | 37.4 |
| 16 | | 12.94 | 0.988 | | |
| 17 | 9th Lens | −19.96 | 0.361 | 1.535 | 55.7 |
| 18 | | 2.89 | 0.250 | | |
| 19 | IR cut Filter | Infinity | 0.210 | 1.5168 | 64.2 |
| 20 | | Infinity | 0.357 | | |
| 21 | Image | Infinity | | | |

Table 10 illustrates aspherical surface values of the example optical imaging system according to the fifth embodiment.

TABLE 10

| | 1 | 2 | 3 | 4 | 5 | 6 | 7 | 8 | 9 |
|---|---|---|---|---|---|---|---|---|---|
| K | −1.010 | 6.368 | 30.944 | 7.714 | −99.000 | 99.000 | 99.000 | 99.000 | −15.746 |
| A | 0.010 | 0.000 | −0.045 | 0.002 | 0.025 | −0.041 | −0.049 | −0.037 | −0.076 |
| B | 0.028 | −0.178 | 0.190 | −0.161 | −0.595 | 0.171 | 0.326 | 0.047 | 0.159 |
| C | −0.191 | 0.969 | −0.917 | 1.354 | 4.03 | −1.134 | −1.716 | 0.008 | −0.544 |
| D | 0.700 | −3.209 | 3.133 | −6.489 | −17.41 | 4.432 | 5.681 | −0.467 | 1.366 |
| E | −1.591 | 7.155 | −7.331 | 20.647 | 50.98 | −11.474 | −12.889 | 1.666 | −2.469 |
| F | 2.421 | −11.203 | 12.149 | −45.460 | −104.63 | 20.729 | 20.755 | −3.265 | 3.241 |
| G | −2.561 | 12.611 | −14.578 | 71.046 | 153.71 | −26.836 | −24.211 | 4.173 | −3.111 |
| H | 1.923 | −10.324 | 12.787 | −79.937 | −163.42 | 25.202 | 20.649 | −3.689 | 2.184 |
| J | −1.032 | 6.149 | −8.190 | 64.970 | 125.84 | −17.185 | −12.866 | 2.305 | −1.114 |

TABLE 10-continued

| | | | | | | | | | |
|---|---|---|---|---|---|---|---|---|---|
| L | 0.393 | −2.635 | 3.782 | −37.813 | −69.45 | 8.419 | 5.787 | −1.017 | 0.406 |
| M | −0.104 | 0.791 | −1.224 | 15.371 | 26.75 | −2.886 | −1.829 | 0.311 | −0.102 |
| N | 0.018 | −0.158 | 0.263 | −4.145 | −6.83 | 0.657 | 0.385 | −0.063 | 0.017 |
| O | −0.002 | 0.019 | −0.034 | 0.666 | 1.037 | −0.089 | −0.049 | 0.007 | −0.002 |
| P | 0.000 | −0.001 | 0.002 | −0.048 | −0.071 | 0.005 | 0.003 | 0.000 | 0.000 |

| | 10 | 11 | 12 | 13 | 14 | 15 | 16 | 17 | 18 |
|---|---|---|---|---|---|---|---|---|---|
| K | −99.000 | −99.000 | −2.259 | −1.187 | 1.506 | −1.007 | 6.964 | 9.952 | −0.892 |
| A | −0.038 | −0.101 | −0.168 | −0.067 | −0.055 | −0.035 | 0.052 | −0.075 | −0.086 |
| B | 0.017 | 0.126 | 0.172 | 0.039 | 0.007 | −0.017 | −0.043 | 0.017 | 0.026 |
| C | 0.027 | −0.183 | −0.245 | −0.080 | −0.015 | 0.026 | 0.031 | 0.001 | −0.006 |
| D | −0.217 | 0.263 | 0.324 | 0.106 | 0.022 | −0.019 | −0.018 | −0.001 | 0.001 |
| E | 0.534 | −0.313 | −0.322 | −0.082 | −0.017 | 0.008 | 0.007 | 0.000 | 0.000 |
| F | −0.782 | 0.278 | 0.231 | 0.041 | 0.008 | −0.002 | −0.002 | 0.000 | 0.000 |
| G | 0.768 | −0.179 | −0.122 | −0.014 | −0.003 | 0.000 | 0.000 | 0.000 | 0.000 |
| H | −0.528 | 0.083 | 0.048 | 0.003 | 0.001 | 0.000 | 0.000 | 0.000 | 0.000 |
| J | 0.258 | −0.028 | −0.014 | −0.001 | 0.000 | 0.000 | 0.000 | 0.000 | 0.000 |
| L | −0.090 | 0.006 | 0.003 | 0.000 | 0.000 | 0.000 | 0.000 | 0.000 | 0.000 |
| M | 0.022 | −0.001 | 0.000 | 0.000 | 0.000 | 0.000 | 0.000 | 0.000 | 0.000 |
| N | −0.003 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 |

Figure 11:
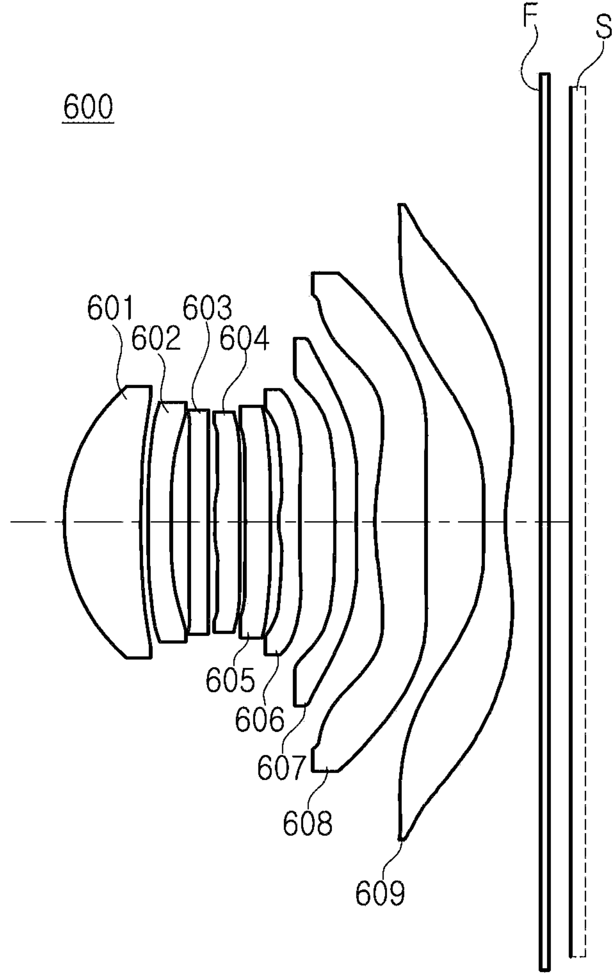
FIG. 11 illustrates a configuration diagram of an example optical imaging system in accordance with a sixth embodiment.
Figure 12:
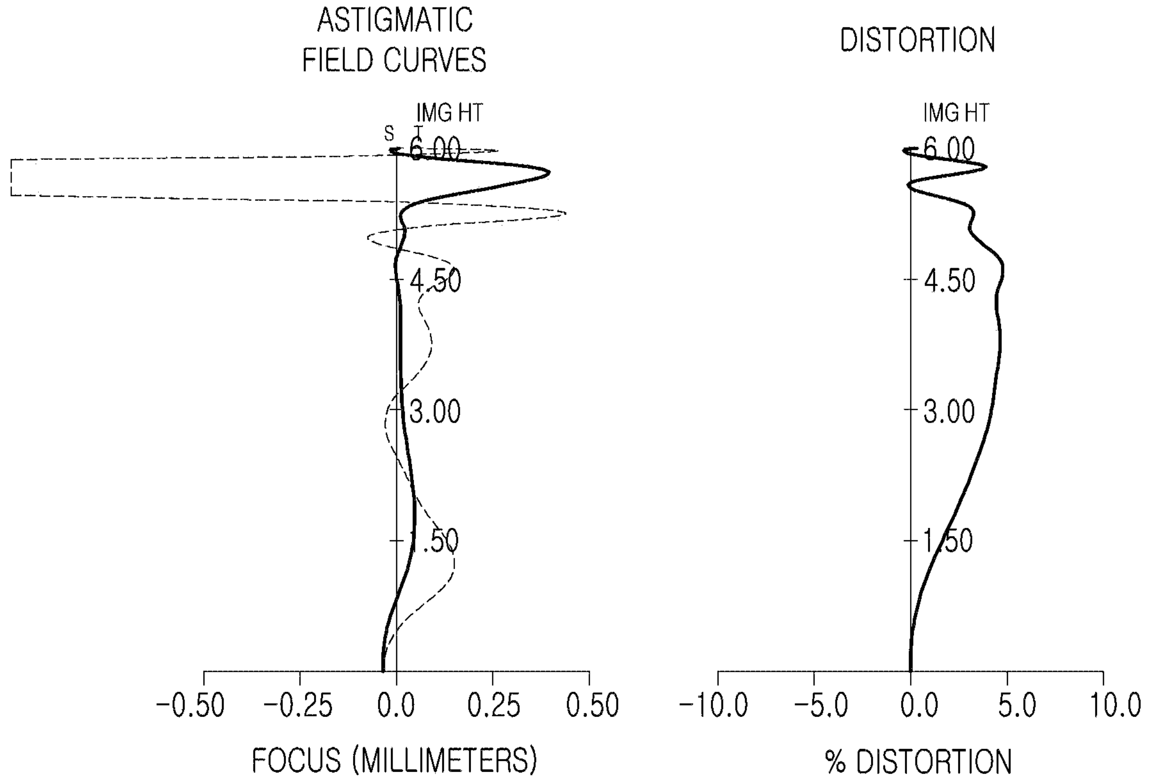
FIG. 12 illustrates an aberration curve of the example optical imaging system illustrated in FIG. 11.

FIG. 11 illustrates a configuration diagram of an example optical imaging system according to a sixth embodiment, and FIG. 12 illustrates an aberration curve of the example optical imaging system illustrated in FIG. 11.

An optical imaging system 600 according to a sixth embodiment may include a first lens 601, a second lens 602, a third lens 603, a fourth lens 604, a fifth lens 605, a sixth lens 606, a seventh lens 607, an eighth lens 608, and a ninth lens 609, sequentially arranged from an object side to an imaging side.

The first lens 601 may have positive refractive power, a first surface of the first lens 601 may be convex in the paraxial region, and a second surface of the first lens may be concave in the paraxial region.

The second lens 602 may have negative refractive power, a first surface of the second lens 602 may be convex in the paraxial region, and a second surface of the second lens may be concave in the paraxial region.

The third lens 603 may have negative refractive power, a first surface of the third lens 603 may be convex in the paraxial region, and a second surface of the third lens may be concave in the paraxial region.

The fourth lens 604 may have positive refractive power, a first surface of the fourth lens 604 may be convex in the paraxial region, and a second surface of the fourth lens may be concave in the paraxial region.

The fifth lens 605 may have positive refractive power, a first surface of the fifth lens 605 may be concave in the paraxial region, and a second surface of the fifth lens may be convex in the paraxial region.

The sixth lens 606 may have negative refractive power, a first surface of the sixth lens 606 may be convex in the paraxial region, and a second surface of the sixth lens may be concave in the paraxial region.

The seventh lens 607 may have negative refractive power, a first surface of the seventh lens 607 may be convex in the paraxial region, and a second surface of the seventh lens may be concave in the paraxial region.

The eighth lens 608 may have positive refractive power, and a first surface of the eighth lens 608 may be convex in the paraxial region, and a second surface of the eight lens may be concave in the paraxial region.

The ninth lens 609 may have negative refractive power, a first surface of the ninth lens 609 may be convex in the paraxial region, and a second surface of the ninth lens may be concave in the paraxial region.

The optical imaging system 600 according to the sixth embodiment may include a plastic lens. In an example, all of the first to ninth lenses may be formed of a plastic material.

Additionally, the optical imaging system 600 according to the sixth embodiment may include a stop (not illustrated), an infrared cut-off filter F, and an image sensor S. In an example, the stop may be disposed between the second lens 602 and the third lens 603.

Table 11 illustrates properties of the example optical imaging system according to the sixth embodiment.

TABLE 11

| Surface No. | | Curvature Radius | Thickness/ Distance | Refractive Index | Abbe No. |
|---|---|---|---|---|---|
| 0 | Object | Infinity | | | |
| 1 | $1^{st}$ Lens | 2.42 | 1.078 | 1.544 | 56.0 |
| 2 | | 13.27 | 0.095 | | |
| 3 | $2^{nd}$ Lens | 13.84 | 0.292 | 1.680 | 18.2 |
| 4 | | 5.94 | 0.265 | | |
| 5 | $3^{rd}$ Lens | 946.99 | 0.289 | 1.671 | 19.2 |
| 6 | | 230.28 | 0.100 | | |
| 7 | $4^{th}$ Lens | 10.30 | 0.341 | 1.614 | 25.9 |
| 8 | | 10.28 | 0.100 | | |
| 9 | $5^{th}$ Lens | −30.79 | 0.341 | 1.567 | 37.4 |
| 10 | | −12.29 | 0.108 | | |
| 11 | $6^{th}$ Lens | 11.60 | 0.298 | 1.680 | 18.2 |
| 12 | | 10.23 | 0.483 | | |
| 13 | $7^{th}$ Lens | 37.31 | 0.300 | 1.614 | 25.9 |
| 14 | | 9.21 | 0.284 | | |
| 15 | $8^{th}$ Lens | 3.75 | 0.684 | 1.567 | 37.4 |
| 16 | | 31.06 | 0.842 | | |
| 17 | $9^{th}$ Lens | 10.84 | 0.301 | 1.535 | 55.7 |
| 18 | | 2.32 | 0.500 | | |
| 19 | IR cut Filter | Infinity | 0.110 | 1.5168 | 64.2 |
| 20 | | Infinity | 0.275 | | |
| 21 | Image | Infinity | | | |

Table 12 illustrates aspherical surface values of the example optical imaging system according to the sixth embodiment.

TABLE 12

| | 1 | 2 | 3 | 4 | 5 | 6 | 7 | 8 | 9 |
|---|---|---|---|---|---|---|---|---|---|
| K | −0.503 | 21.664 | 42.075 | 3.436 | −72.329 | 55.993 | −50.484 | −20.656 | 70.140 |
| A | −0.010 | 0.005 | 0.026 | −0.008 | 0.001 | 0.000 | −0.013 | −0.014 | −0.032 |
| B | 0.066 | −0.038 | −0.222 | 0.063 | 0.000 | 0.000 | −0.044 | −0.012 | 0.285 |
| C | −0.130 | 0.341 | 1.193 | −0.218 | 0.000 | −0.032 | 0.122 | −0.081 | −1.202 |
| D | 0.066 | −1.354 | −3.795 | 0.376 | −0.001 | 0.194 | −0.272 | 0.402 | 3.050 |
| E | 0.220 | 3.023 | 7.711 | −0.085 | 0.003 | −0.632 | 0.561 | −0.925 | −5.033 |
| F | −0.542 | −4.307 | −10.576 | −1.084 | −0.008 | 1.358 | −1.046 | 1.093 | 5.415 |
| G | 0.621 | 4.173 | 10.140 | 2.698 | 0.012 | −2.042 | 1.561 | −0.419 | −3.601 |
| H | −0.443 | −2.843 | −6.926 | −3.543 | −0.014 | 2.193 | −1.724 | −0.627 | 1.101 |
| J | 0.213 | 1.379 | 3.387 | 2.998 | 0.012 | −1.690 | 1.366 | 1.123 | 0.351 |
| L | −0.070 | −0.475 | −1.176 | −1.711 | −0.007 | 0.926 | −0.761 | −0.874 | −0.550 |
| M | 0.016 | 0.113 | 0.283 | 0.657 | 0.003 | −0.352 | 0.291 | 0.402 | 0.278 |
| N | −0.002 | −0.018 | −0.045 | −0.163 | −0.001 | 0.088 | −0.073 | −0.112 | −0.077 |
| O | 0.000 | 0.002 | 0.004 | 0.024 | 0.000 | −0.013 | 0.011 | 0.018 | 0.012 |
| P | 0.000 | 0.000 | 0.000 | −0.002 | 0.000 | 0.001 | −0.001 | −0.001 | −0.001 |

| | 10 | 11 | 12 | 13 | 14 | 15 | 16 | 17 | 18 |
|---|---|---|---|---|---|---|---|---|---|
| K | 0.509 | 48.261 | −7.361 | 96.695 | −62.948 | −17.829 | −42.265 | 0.880 | −11.822 |
| A | 0.003 | −0.040 | −0.032 | −0.080 | −0.124 | −0.012 | −0.008 | −0.211 | −0.110 |
| B | −0.086 | −0.041 | 0.006 | 0.041 | 0.105 | −0.019 | 0.016 | 0.140 | 0.067 |
| C | 0.521 | 0.130 | −0.052 | 0.103 | −0.084 | 0.034 | −0.018 | −0.068 | −0.028 |
| D | −1.783 | −0.125 | 0.228 | −0.372 | 0.046 | −0.037 | 0.010 | 0.024 | 0.008 |
| E | 3.865 | −0.474 | −0.589 | 0.594 | −0.012 | 0.025 | −0.005 | −0.006 | −0.002 |
| F | −5.668 | 1.926 | 0.959 | −0.589 | −0.004 | −0.011 | 0.002 | 0.001 | 0.000 |
| G | 5.860 | −3.426 | −1.035 | 0.395 | 0.006 | 0.003 | −0.001 | 0.000 | 0.000 |
| H | −4.379 | 3.738 | 0.767 | −0.185 | −0.003 | −0.001 | 0.000 | 0.000 | 0.000 |
| J | 2.391 | −2.717 | −0.396 | 0.061 | 0.001 | 0.000 | 0.000 | 0.000 | 0.000 |
| L | −0.951 | 1.348 | 0.142 | −0.014 | 0.000 | 0.000 | 0.000 | 0.000 | 0.000 |
| M | 0.270 | −0.452 | −0.035 | 0.002 | 0.000 | 0.000 | 0.000 | 0.000 | 0.000 |
| N | −0.052 | 0.098 | 0.006 | 0.000 | 0.000 | 0.000 | 0.000 | 0.000 | 0.000 |
| O | 0.006 | −0.013 | −0.001 | 0.000 | 0.000 | 0.000 | 0.000 | 0.000 | 0.000 |
| P | 0.000 | 0.001 | 0.000 | 0.000 | 0.000 | 0.000 | 0.000 | 0.000 | 0.000 |

Table 13 illustrates properties of the example optical imaging systems according to the first to sixth embodiments.

TABLE 13

| | Ex1 | Ex2 | Ex3 | Ex4 | Ex5 | Ex6 |
|---|---|---|---|---|---|---|
| f | 5.7 | 5.7 | 5.6 | 5.7 | 5.6 | 5.9 |
| f1 | 5.7 | 5.6 | 5.6 | 5.5 | 5.8 | 5.2 |
| f2 | −16.9 | −14.7 | −16.6 | −14.2 | −28.4 | −15.4 |
| f3 | 33.8 | 52.8 | 28.3 | 42.8 | −3700.2 | −448.3 |
| f4 | −33.2 | 1012.1 | −50.3 | 123.9 | −35.5 | 1621.0 |
| f5 | 39.4 | 63.6 | −855.1 | −262.4 | 23.0 | 35.6 |
| f6 | −11.9 | −8.4 | −11.0 | −8.8 | −8.5 | −138.3 |
| f7 | 42.8 | 19.2 | 26.7 | 17.1 | 21.9 | −19.8 |
| f8 | 5.5 | 5.4 | 5.3 | 5.4 | 5.4 | 7.4 |
| f9 | −4.7 | −4.7 | −4.7 | −4.7 | −4.7 | −5.6 |
| TTL | 7.0 | 7.0 | 6.9 | 7.0 | 7.0 | 7.1 |
| BFL | 0.9 | 0.9 | 0.8 | 0.9 | 0.8 | 0.9 |
| IMH | 6.0 | 6.0 | 6.0 | 6.0 | 6.0 | 6.0 |
| FOV | 89.2 | 89.2 | 90.3 | 89.3 | 90.3 | 87.8 |
| F-number | 1.69 | 1.68 | 1.68 | 1.68 | 1.71 | 1.61 |

An example optical imaging system according to an embodiment may achieve high resolution images, although the optical imaging system has a slim thickness.

Additionally, an example optical imaging system according to an embodiment may acquire bright, or high resolution, images and videos by having a low F-number value.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An optical imaging system, comprising:

a first lens, a second lens, a third lens, a fourth lens, a fifth lens, a sixth lens having negative refractive power, a seventh lens, an eighth lens, and a ninth lens, sequentially arranged from an object side toward an image plane, wherein the optical imaging system satisfies the following conditional expressions:

$$TTL/2IMH < 0.6, \text{ and} \quad (1)$$

$$Fno < 1.72, \quad (2)$$

where TTL is a distance from an object side surface of the first lens to the image plane, 2IMH is a maximum effective image height of the image plane, and Fno is an F number of the optical imaging system.

2. The optical imaging system of claim 1, wherein the first lens has positive refractive power, and wherein the second lens has negative refractive power.

3. The optical imaging system of claim 1, wherein an object side surface of any one of the fourth lens or the fifth lens has a concave shape in a paraxial region.

4. The optical imaging system of claim 1, wherein the following conditional expression is satisfied:

$$2.3 < T1/T9 < 3.8,$$

where T1 is an optical axis thickness of the first lens, and T9 is an optical axis thickness of the ninth lens.

5. The optical imaging system of claim 1, wherein the following conditional expression is satisfied:

$$1.7 < TTL/\Sigma CT < 1.9,$$

where TTL is a distance from an object side surface of the first lens to the image plane, and ΣCT is a sum of optical axis thicknesses of the first lens to the ninth lens.

6. The optical imaging system of claim 1, wherein the following conditional expression is satisfied:

$$2.5 < TTL/\Sigma AT < 2.8,$$

where TTL is a distance from an object side surface of the first lens to the image plane, and ΣAT is a sum of optical axis intervals of the first lens to the ninth lens.

7. The optical imaging system of claim 1, wherein the following conditional expression is satisfied:

$$-6 < f2/f < -2,$$

where f2 is a focal length of the second lens, and f is a focal length of the optical imaging system.

8. The optical imaging system of claim 1, wherein the seventh lens and the eighth lens have a convex object side surface and a concave image side surface.

9. The optical imaging system of claim 1, wherein the following conditional expression is satisfied:

$$9 < v1/f1 < 11,$$

where v1 is Abbe number of the first lens, and f1 is a focal length of the first lens.

10. The optical imaging system of claim 1, wherein the following conditional expression is satisfied:

$$11 < Fno^{*}TTL < 12,$$

where Fno is an F number of the optical imaging system, and TTL is a distance from an object side surface of the first lens to the image plane.

11. An optical imaging system, comprising:

a first lens having positive refractive power;

a second lens having negative refractive power;

a third lens having refractive power;

a fourth lens having a concave object side surface;

a fifth lens having refractive power;

a sixth lens having negative refractive power;

a seventh lens having refractive power, and having a convex object side surface and a concave image side surface;

an eighth lens having positive refractive power; and a ninth lens having negative refractive power, wherein the first lens to the ninth lens are sequentially arranged from an object side toward an image plane, and wherein the optical imaging system satisfies the following conditional expressions:

$$Fno < 1.72, \text{ and} \quad (1)$$

$$TTL/2IMH < 0.6, \quad (2)$$

where Fno is an F number of the optical imaging system, TTL is a distance from an object side surface of the first lens to the image plane, and 2IMH is a maximum effective image height of the image plane.

12. The optical imaging system of claim 11, wherein the following conditional expression is satisfied:

$$1.4 < \Sigma CT/\Sigma AT < 1.6,$$

where ΣCT is a sum of optical axis thicknesses of the first lens to the ninth lens, and ΣAT is a sum of optical axis intervals of the first lens to the ninth lens.

13. The optical imaging system of claim 11, wherein the following conditional expression is satisfied:

$$FOV^{*}IMH/f < 97,$$

where FOV is an angle of view of the optical imaging system, IMH is ½ of a diagonal length of the image plane, and f is a focal length of the optical imaging system.

14. The optical imaging system of claim 11, wherein the following conditional expression is satisfied:

$$18 < v1 - v5 < 31,$$

where v1 is Abbe number of the first lens, and v5 is Abbe number of the fifth lens.

15. The optical imaging system of claim 11, wherein the following conditional expression is satisfied:

$$2.3 < T1/T9 < 3.8,$$

where T1 is an optical axis thickness of the first lens, and T9 is an optical axis thickness of the ninth lens.

16. An optical imaging system, comprising:

a first lens, a second lens having negative refractive power, a third lens, a fourth lens, a fifth lens, a sixth lens having negative refractive power, a seventh lens, an eighth lens, and a ninth lens, sequentially arranged from an object side toward an image plane, wherein the optical imaging system satisfies the following conditional expressions:

$$TTL/2IMH < 0.6, \quad (1)$$

$$2.5 < TTL/\Sigma AT < 2.8, \text{ and} \quad (2)$$

$$2.3 < T1/T9 < 3.8, \quad (3)$$

where TTL is a distance from an object side surface of the first lens to the image plane, 2IMH is a diagonal length of the image plane, ΣAT is a sum of optical axis intervals of the first lens to the ninth lens, T1 is an optical axis thickness of the first lens, and T9 is an optical axis thickness of the ninth lens.

* * * * *